(12) United States Patent
Rupiper et al.

(10) Patent No.: US 6,773,049 B2
(45) Date of Patent: Aug. 10, 2004

(54) ADJUSTABLE SEAT SUSPENSION FOR UTILITY VEHICLE

(75) Inventors: Christopher L. Rupiper, Lomira, WI (US); David A. Westimayer, Horicon, WI (US)

(73) Assignee: Deere & Co., Moline, IL (US)

( * ) Notice: Subject to any disclaimer, the term of this patent is extended or adjusted under 35 U.S.C. 154(b) by 0 days.

(21) Appl. No.: 10/273,534

(22) Filed: Oct. 18, 2002

(65) Prior Publication Data

US 2004/0075291 A1 Apr. 22, 2004

(51) Int. Cl.[7] .................................................. B60N 2/50
(52) U.S. Cl. ...................................... 296/63; 296/65.02
(58) Field of Search ................................ 296/63, 65.01, 296/65.02; 248/636, 419; 297/344.15, 346

(56) References Cited

U.S. PATENT DOCUMENTS

| | | | |
|---|---|---|---|
| 3,957,304 A | * | 5/1976 | Koutsky et al. ............. 248/624 |
| 4,228,984 A | | 10/1980 | Thompson et al. |
| 4,258,896 A | | 3/1981 | Kato et al. |
| 4,477,050 A | | 10/1984 | Thompson et al. |
| 4,714,227 A | | 12/1987 | Holm et al. |
| 4,930,593 A | | 6/1990 | Swartzendruber et al. |
| 4,969,533 A | | 11/1990 | Holm et al. |
| 5,116,016 A | * | 5/1992 | Nagata ....................... 248/564 |
| 5,273,260 A | * | 12/1993 | Nagata ..................... 296/65.02 |
| 5,765,803 A | * | 6/1998 | Graham ...................... 248/624 |
| 5,794,911 A | * | 8/1998 | Hill ............................. 248/588 |
| 5,799,922 A | * | 9/1998 | Timms et al. ............... 248/564 |
| 6,347,778 B1 | * | 2/2002 | Koga et al. ................. 248/421 |

* cited by examiner

Primary Examiner—Lori L. Coletta
(74) Attorney, Agent, or Firm—The Law Office of Randall T. Erickson, P.C.

(57) ABSTRACT

A seat assembly for an off-road vehicle includes a seat having a bottom surface, and a resilient seat suspension supporting the seat. The seat is supported at least in part by a first bumper element carried by the seat suspension. The first bumper element includes a protruding portion interposed between the seat bottom surface and the seat suspension, the protruding portion supporting a portion of the seat from the seat suspension. The seat suspension and the first bumper element are arranged to adjust a length of the protruding portion. The length of the protruding portion can be adjusted to set an elevation of the seat at the point of support by the first bumper element. The seat can also be adjustably connected to another part of the resilient seat suspension by use of a seat bracket with selectable holes to register with holes provided on the resilient seat suspension.

15 Claims, 5 Drawing Sheets

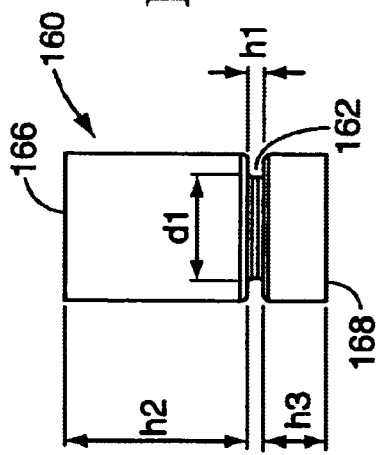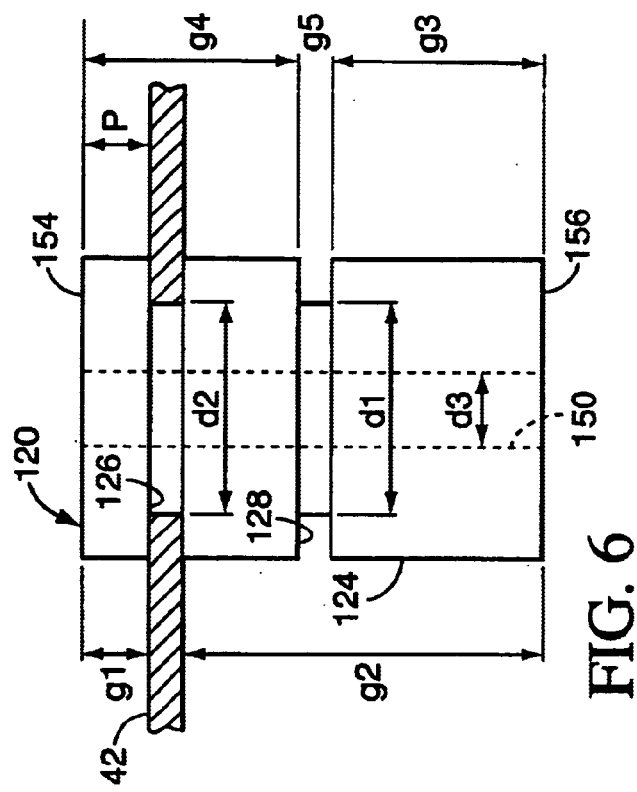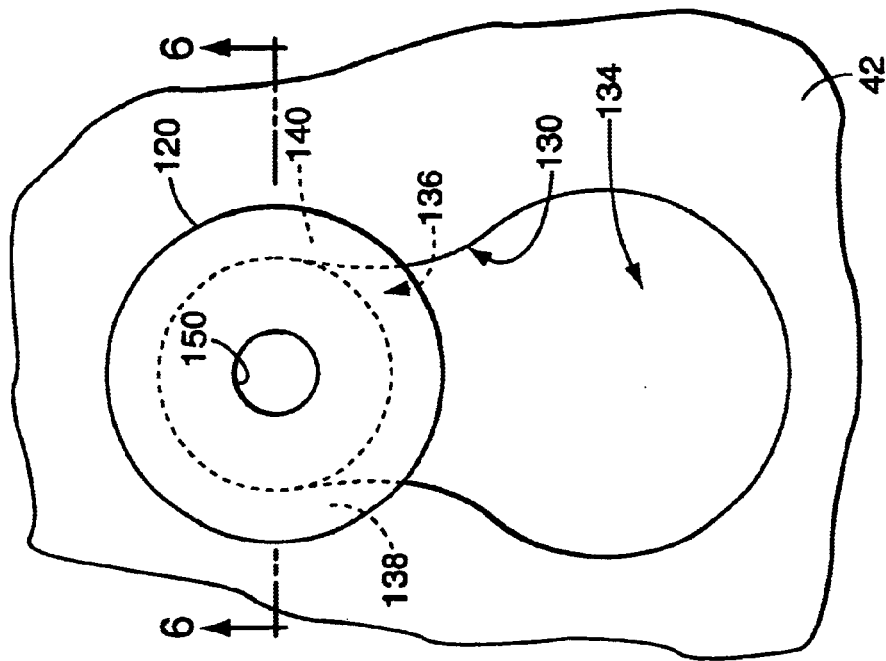

ADJUSTABLE SEAT SUSPENSION FOR UTILITY VEHICLE

TECHNICAL FIELD OF THE INVENTION

The present invention relates to seat suspension systems and more particularly to an improved seat suspension system having a mechanism for adjusting the vertical elevation and tilt of the seat.

BACKGROUND OF THE INVENTION

It is known to provide seat suspension systems which dampen vertical seat movement in response to vehicle motion. It is also known and common to provide a fixed amount of vertical resiliency.

In off-road vehicles such as lawn and garden tractors, one conventional seat suspension systems consists of two vertically arranged springs between the seat and tractor body for cushioning the force transmitted to an operator sitting in the seat.

Operators of different heights or weights may desire vertical adjustment of the seat for comfortable riding. Some prior seat suspension systems are not adjustable or require tool adjustment of the seat height to accomplish this adjustment.

The present inventor has recognized it would be desirable to provide a seat suspension system that was vertically adjustable with little or no need for tool adjustment.

The present inventor has recognized that it would be desirable to provide an elastomer bumper that supports a portion of a seat, the elastomer bumper being adjustable in effective length by a simple manipulation without the necessity of tool adjustment.

SUMMARY OF THE INVENTION

The invention provides a seat assembly for an off-road vehicle, wherein the height and/or angle of tilt of a driver's seat can be easily adjusted by the provision of at least a first elastomer bumper.

According to one exemplary embodiment of the invention, the seat assembly includes a seat having a bottom surface, and a resilient seat suspension supporting the seat. The seat is supported at least in part by the first bumper element carried by the seat suspension. The first bumper element includes a protruding portion interposed between the seat bottom surface and the seat suspension, the protruding portion supporting a portion of the seat from the seat suspension. The seat suspension and the first bumper element are arranged to adjust a length of the protruding portion.

The length of the protruding portion can be adjusted to set an elevation of the seat at the point of support by the first bumper element. The seat can also be adjustably connected to another part of the resilient seat suspension by use of a seat bracket with selectable holes to register with holes provided on the resilient seat suspension.

The seat suspension can comprises an upper support plate. The upper support plate comprises a first elongated opening having a wide region and a narrow region, and the first bumper element comprises one or more grooves spaced apart along a length of the bumper element. The narrow region is shaped to receive the first bumper element therein with a select one of the grooves receiving portions of the upper support plate therein to fix the first bumper element to the upper support plate.

The seat assembly can comprise a second bumper element identical to the first bumper element, and the upper support plate can comprise a second elongated opening identical to the first elongated opening. The first and second bumper elements can be arranged laterally spaced apart and fixed to the upper support plate.

The seat suspension can include a baseplate and two springs arranged between the baseplate and the upper support plate. A front pair of links can be pivotally connected to the baseplate at a front end thereof and pivotally connected at a rear end thereof to the upper support plate. A rear pair of links can be pivotally connected at a front end thereof to the baseplate and at a rear end thereof to the upper support plate.

The first and second bumper elements can each comprise a cylinder having one annular groove or plural spaced apart annular grooves, and the upper support plate can comprise elongated openings each having a first region sized to allow entrance of the cylinder vertically therethrough, and a second region open to the first region and having a width that prevents vertical entrance of the cylinder through the second region. The second region is of a width that accepts a width of the cylinder taken through the selected annular groove, to allow lateral sliding movement of the cylinder into the second region with wall portions of the upper support plate adjacent opposite sides of the second region entering a select one of the grooves. The width of the cylinder taken through the annular groove can be slightly greater than the width of the second region but can be resiliently compressed to fit within the second region to lock the cylinder to the upper support plate.

Numerous other advantages and features of the present invention will be become readily apparent from the following detailed description of the invention and the embodiments thereof, from the claims and from the accompanying drawings.

BRIEF DESCRIPTION OF THE DRAWINGS

FIG. 5 is a plan view of a portion of the seat suspension system;

FIG. 6 is a sectional view taken generally through line 6—6 of FIG. 5; and

FIG. 7 is an elevational view of an alternate embodiment bumper.

DETAILED DESCRIPTION OF THE PREFERRED EMBODIMENTS

Figure 1:
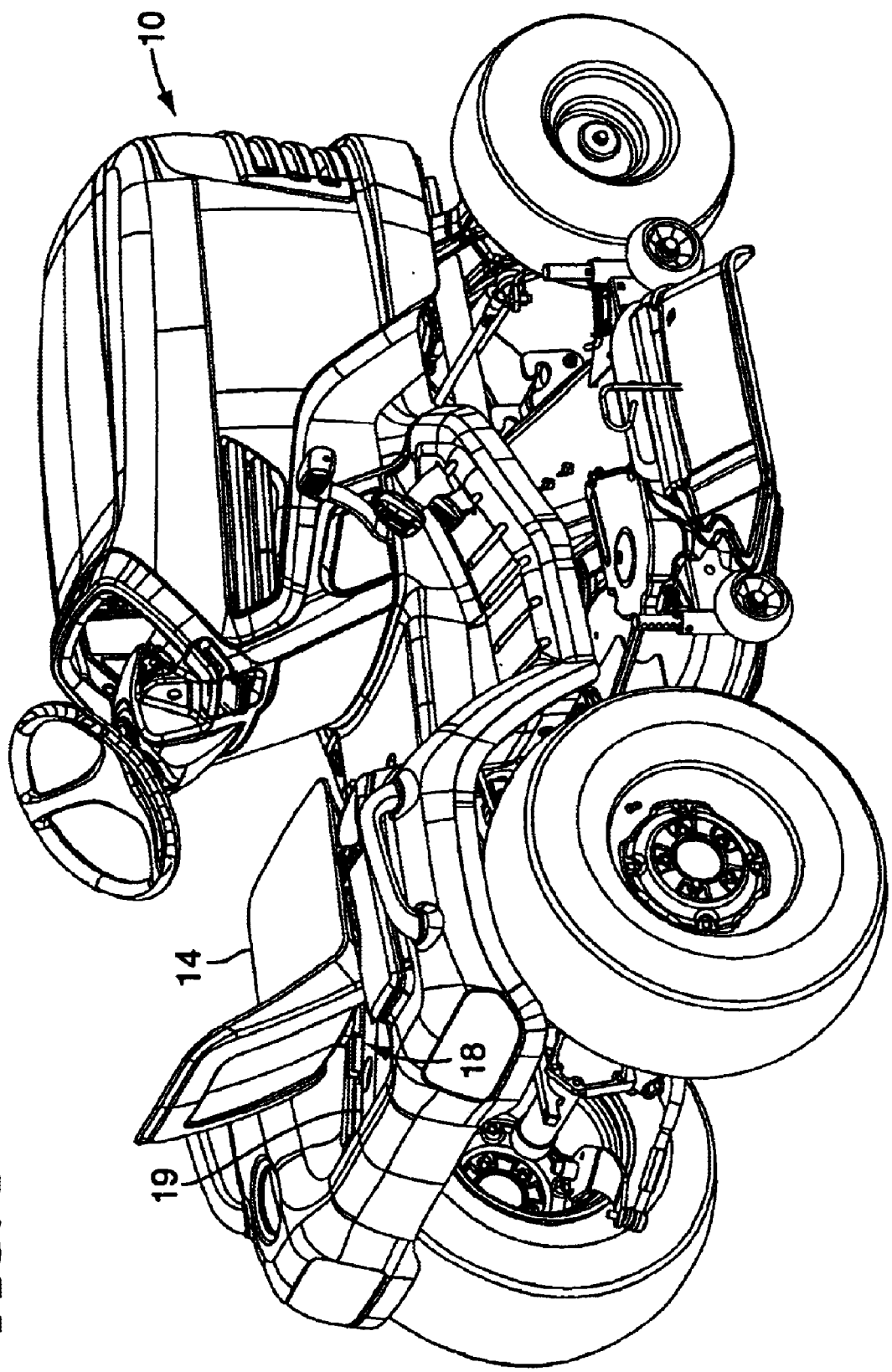
FIG. 1 is a perspective view of an off-road vehicle incorporating the seat suspension system of the present invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 illustrates an off-road vehicle 10, such as a lawn tractor of a type such as JOHN DEERE lawn and garden tractor models 425, 445 or 455. The vehicle 10 includes a vehicle seat 14 supported on a seat suspension system 18 that is mounted on a vehicle body 19.

Figure 3:
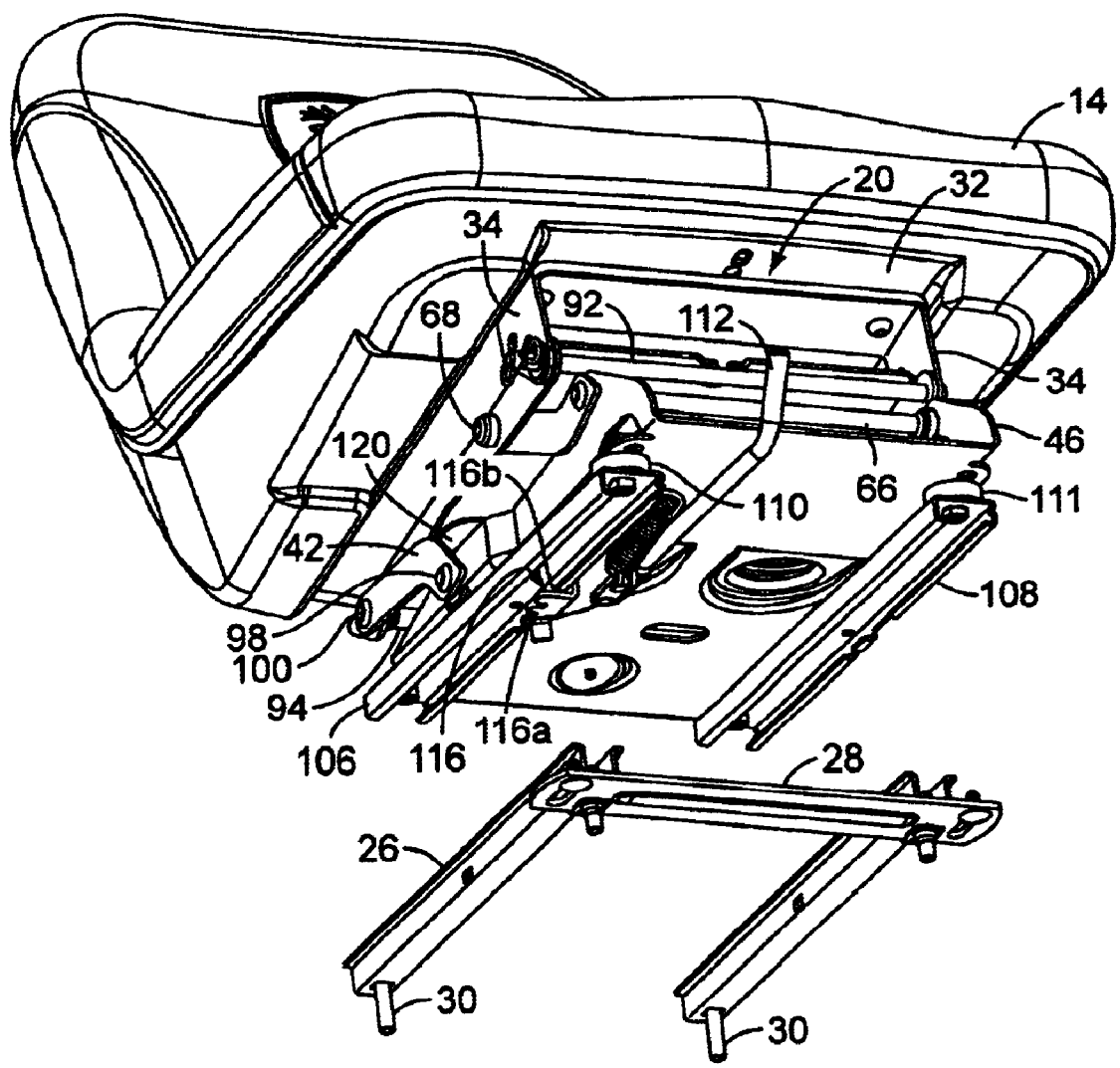
FIG. 3 is a bottom perspective view, partially exploded, of the seat and seat suspension system of FIG. 2.

FIGS. 24 illustrate the seat 14 and the suspension system 18 in more detail. The suspension system includes a seat bracket 20, a resilient suspension assembly 24, and support channels 26, 27 connected by a crossmember 28 (FIG. 3). The seat bracket 20 is fastened to the seat 14 and to the suspension assembly 24 by a connecting rod 29. The suspension assembly 24 is slidingly carried on the channels 26, 27 that are fastened to the vehicle body 19 via the crossmember 28 at a front side and by fasteners 30 at a rear side. A crossmember can also be used at the rear side if necessary to reinforce the connection to the vehicle body 19.

The seat bracket 20 includes a horizontal member 32 attached to a bottom of the seat 14 with fasteners, and two vertical attachment members 34. The two vertical attachment members 34 each include attachment holes 36a, 36b, 36c arranged along an oblique line tilted rearward from the lowest hole 36a to the highest hole 36c.

The suspension assembly 24 includes an upper support plate 42 and a baseplate 46. A pair of front links 50, 52, angled rearward, connects a front portion of the baseplate 46 to the upper support plate 42, via pivot rods 66, 68.

Two springs 70, 72 are carried on the baseplate 46 and support the pivot rod 68, which effectively supports the upper support plate 42 that is connected to the pivot rod 68. A suspension bumper 78 is carried by the baseplate 46 and located to the rear of the springs 70, 72. In normal operation, when riding over smooth terrain, the upper support plate 42 is entirely supported by the springs 70, 72. The suspension bumper 78 is impacted by the upper support plate 42 when the vehicle 10 experiences excessive seat amplitude, such as when the vehicle strikes an object or a hole, or rides over rough terrain.

The upper support plate 42 includes holes 84, 86 that are registerable with a select one of the holes 36a–36c of each vertical member 34 to adjust the height of a front of the seat 14. A connecting rod 92 is inserted through the selected pair of holes 36a, 36a; 36b, 36b; or 36c, 36c of the holes 36a–36c of the vertical members 34, 34 and the holes 84, 86 to connect the bracket 20 to the upper support plate 42.

A pair of rear links 94, 96, angled rearward, connect a rear portion of the baseplate 46 to the rear portion of the upper support plate 42, via connection by two pivot rods 98,100.

The baseplate 46 is fastened to slide rails 106, 108 that are slidably engaged to the channels 26, 27. Front elastomer bushings 110,111 are arranged between the slide rails 106, 108 and the baseplate 46. A lever 112 is operatively connected to a latching mechanism 116 that is used by an operator to select a relative sliding position of the rails 106, 108 on the channels 26, 27. The latching mechanism has a prong 116a that is biased into a notch 116b in the respective rail 106,108, to engage a select one hole of a plurality of holes (not shown) arranged along the inside facing wall of the channel 26.

Two elastomer bumpers 120, 122 are carried by the upper support plate 42 and support a rear portion of the seat 14 from the upper support plate 42, as described below with respect to FIGS. 5 and 6.

Figure 2:
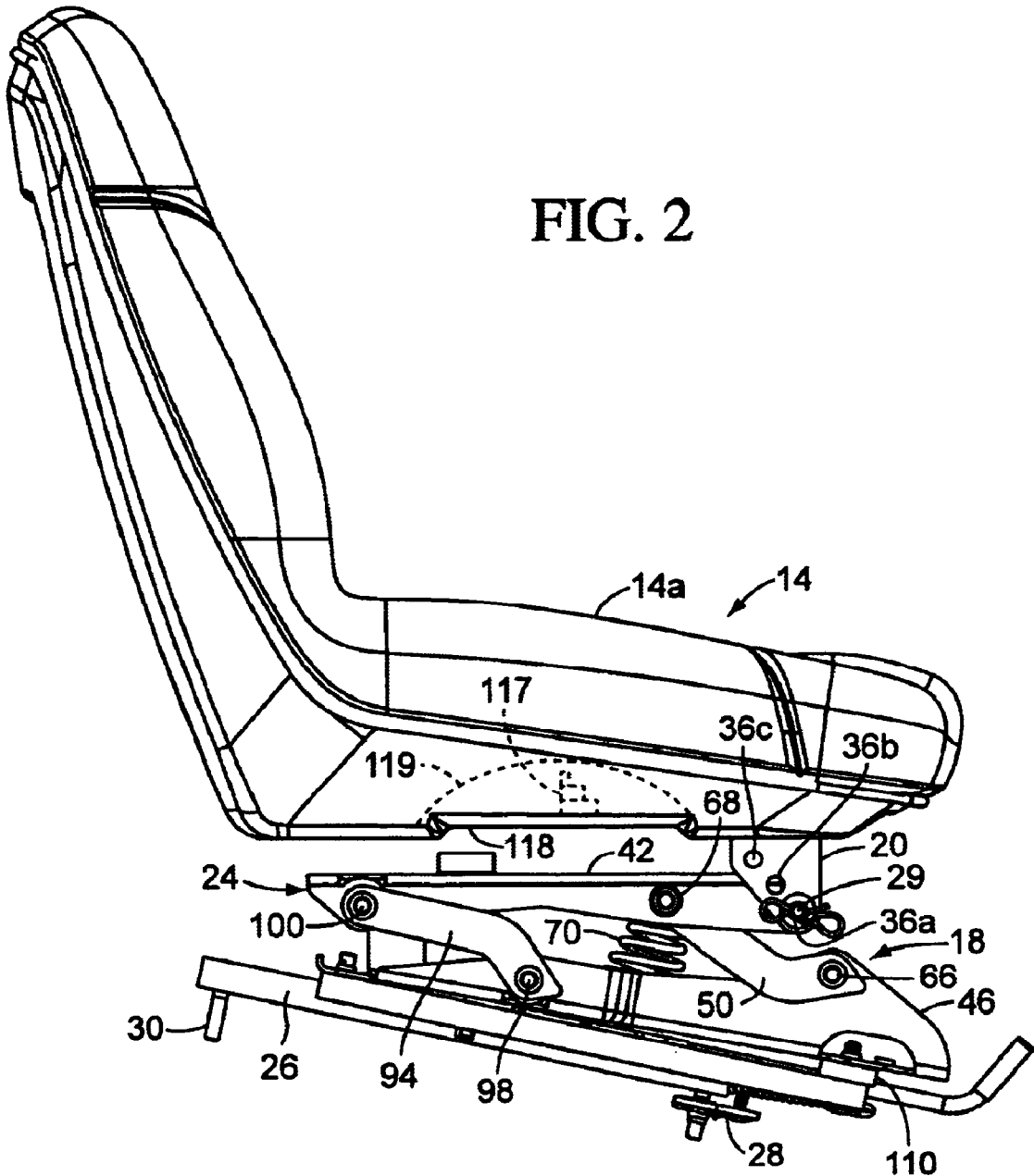
FIG. 2 is an enlarged side view of the seat and seat suspension system of FIG. 1.
Figure 4:
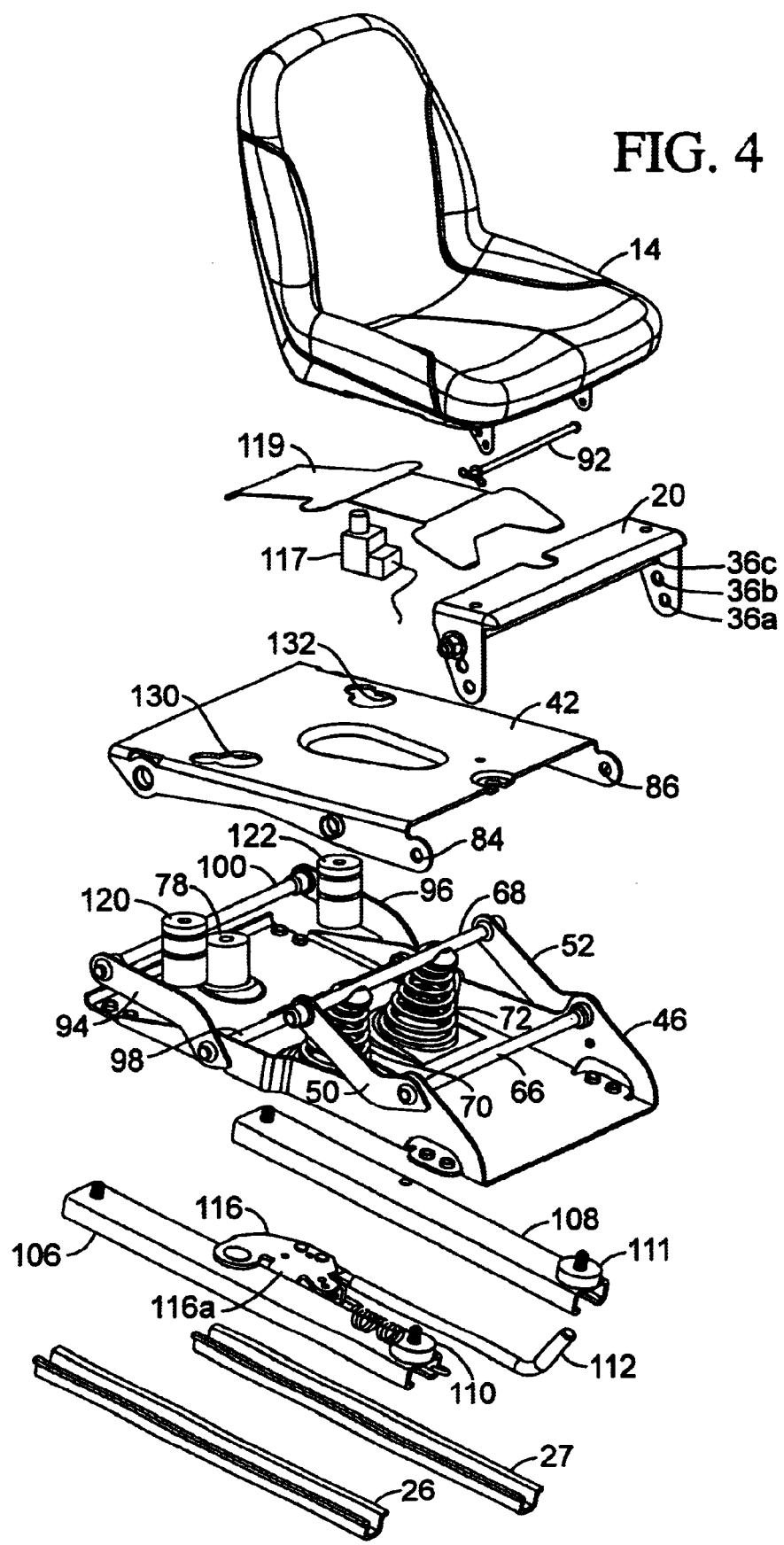
FIG. 4 is an exploded perspective view of the seat and seat suspension system of FIG. 2.

FIGS. 2 and 4 also illustrate an operator presence switch 117 which is fit above a seat bottom wall 118 and below a plate spring 119. When an operator compresses a seat cushion 14a of the seat 14 by sitting down, the plate spring flattens and actuates the presence switch 117. When the operator leaves the seat, the plate spring 119 rebounds and the switch 117 is deactivated. The state of the switch 117 is used in vehicle safety controls.

As illustrated in FIGS. 5 and 6, each bumper 120, 122 includes a cylindrical body 124 having two annular grooves 126, 128 spaced apart along a length of the cylindrical body 124.

The upper support plate 42 includes two elongated openings 130, 132 each having a wide region 134 and a narrow region 136. The wide region 134 can be circular and is large enough to vertically pass the cylindrical body 124 therethrough. The narrow region 136 is defined in part by wall portions 138, 140 that are spaced apart to resiliently enter a select one of the grooves 122, 124 to grippingly lock the cylindrical body 124 to the upper support plate 42. The selected grooves 122, 124 set the vertical extension P of the cylindrical body with respect to the upper support plate 42.

FIGS. 5 and 6 illustrate the elastomer bumper 120 fixed to the upper support plate 42 at the opening 130. The configuration of bumper 122 and the opening 132 is identical. As illustrated, the bumper 120 is set at one of several available vertical extensions P by the engagement of the annular groove 126 to the wall portions 138, 140. The uncompressed diameter d1 of the bumper 120 inside each of the grooves 126, 128 is slightly larger than the width d2 of the narrow region 136. The bumper 120 includes an axial bore or channel 150 that allows for radial compression of the cylindrical body 124 within the grooves 126, 128. This compression provides a resilient gripping of the bumper 120 by the upper support plate 42.

Several vertical extensions P are theoretically available depending on the groove 126, 128 selected to be engaged by the upper support plate 42 and the selected orientation of the bumper body 124, i.e., the orientation selected between top side up as shown or inverted to top side down.

According to an exemplary embodiment of the invention, the elastomer bumpers 120, 122 are composed of polyisoprene having a durometer of 65. The overall diameter of each of the bumpers 120, 122 can be about 32 mm. The uncompressed groove diameter d1 can be about 22 mm. The top groove 126 can be a distance g1 of about 6.5 mm from a top side 154 of the bumper and a distance g2 of about 36.5 mm from a bottom side 156 of the bumper. The lower groove 128 can be a distance g3 of about 21.5 mm from the bottom side 156 of the bumper and a distance g4 of about 21.5 mm from the topside 154 of the bumper. The grooves can have a height g5 of about 3.2 mm. The bore 150 can have a diameter d3 of about 6.5–9.5 mm.

Along with the selected hole pairs of the holes 36a–36c of the vertical members 34, 34, the selection of the groove 122, 124 and/or the orientation of the bumpers 120, 122 sets both the vertical height and the angular tilt of the seat 14. According to an exemplary embodiment of the invention, two grooves 122, 124 are used on the bumpers 120, 122. However, a single groove or more than two grooves could be used and are encompassed by the invention. Furthermore, although the exemplary embodiment includes three adjustment holes 36a–36c, more or fewer adjustment holes could be used and such is encompassed by the invention. According to the exemplary embodiment using three holes 36a–36c and two grooves 122, 124, the seat can be adjusted over approximately a one inch vertical range. The seat can also be adjusted over a ½ inch horizontal range due to the oblique arrangement of the holes 36a–36c.

FIG. 7 illustrates an alternate embodiment bumper 160 which can replace, in a pair of bumpers 160, 160, the previously described bumpers 120, 122. The bumper 160 is cylindrical and has an overall length of about 52 mm and an overall diameter of about 32 mm. The bumper includes one annular groove 162 having a height h1 of about 3.2 mm and an uncompressed inside diameter d1 of about 22 mm. The distance h2 from a top side 166 of the bumper 160 and the groove is about 36.5 mm. The distance h3 between the groove and a bottom side 168 of the bumper 160 is about 12.5 mm.

The bumper 160 of FIG. 7 can be installed as shown in FIG. 6 to provide an extension P equal to the distance h2 or inverted and reinstall to provide an extension P equal to the distance h3.

From the foregoing, it will be observed that numerous variations and modifications may be effected without departing from the spirit and scope of the invention. It is understood that no limitation with respect to the specific apparatus illustrated herein is intended or should be inferred. It is, of course, intended to cover by the appended claims all such modifications as fall within the scope of the claims.

The invention claimed is:

1. A seat assembly for a utility vehicle, comprising:
 a seat having a bottom surface;
 a resilient seat suspension supporting said seat;
 a first bumper element, wherein said first bumper element is carried by said seat suspension and includes a protruding portion interposed between said seat bottom surface and said seat suspension, said protruding portion supporting a portion of said seat from said seat suspension, said seat suspension and said first bumper element arranged to adjust a length of said protruding portion.

2. The seat assembly according to claim 1, wherein said seat suspension comprises an upper support plate, said upper support plate comprising a first elongated opening having a wide region and a narrow region, and said first bumper element comprises grooves spaced apart along a length of said first bumper element, said narrow region shaped to receive the first bumper element therein with a select one of said grooves receiving portions of said upper support plate therein to fix said first bumper element to said upper support plate.

3. The seat assembly according to claim 1, further comprising a second bumper element identical to said first bumper element, and said upper support plate comprises a second elongated opening identical to said first elongated opening, said first and second bumper elements arranged laterally spaced apart and fixed to said upper support plate.

4. The seat assembly according to claim 1, wherein said seat suspension comprises:
 an upper support plate;
 a baseplate;
 at least one of spring arranged between said baseplate and said upper support plate;
 a front link pivotally connected to said baseplate at a front end and pivotally connected at a rear end to said upper support plate;
 a rear link pivotally connected at a front end to said baseplate and at a rear end to said upper support plate;
 wherein said upper support plate comprises a first elongated opening having a wide region and a narrow region, and said first bumper element comprises grooves spaced apart along a length of said first bumper element, said narrow region shaped to receive said first bumper element therein with a select one of said grooves receiving portions of said upper support plate therein to fix said first bumper element to said upper support plate.

5. The seat assembly according to claim 1, wherein said seat is adjustably connected to a front end of said resilient seat suspension.

6. The seat assembly according to claim 1, wherein said seat includes at least one bracket extending vertically and having multiple holes, and said resilient suspension includes a corresponding hole, said multiple holes are each registerable with said corresponding hole at select vertical adjustments of said seat with respect to said seat suspension, to accept a locking element through said one hole and said corresponding hole to set a front vertical adjustment of said seat.

7. The seat assembly according to claim 1, wherein said first bumper element comprises a cylinder having spaced apart annular grooves, and said upper support plate comprises an elongated opening having a first region sized to allow entrance of said cylinder vertically therethrough, and a second region open to said first region and having a width that prevents vertical entrance of said cylinder through said second region but is of a width that accepts a width of said cylinder taken through the annular groove, to allow lateral movement of said cylinder into said second region with wall portions of said upper support plate adjacent opposite sides of said second region entering a select one of said grooves to lock said cylinder to said upper support plate.

8. A resilient support arrangement for a seat for a vehicle, comprising:
 an elastomer bumper having at least two grooves spaced apart along a length of said bumper;
 a lower support element arranged to be supported on a vehicle chassis;
 an upper support element arranged to carry said elastomer bumper, said bumper arranged to support a seat;
 wherein said upper support element comprises an opening between wall portions of said upper support element, said opening shaped to allow said wall portions to enter a select one of said grooves when said bumper is mounted to said upper support element to vertically adjusted distance between said seat and said upper support element.

9. The resilient support arrangement according to claim 8, wherein said bumper comprises a cylinder and said grooves are annular.

10. The resilient support arrangement according to claim 9, wherein said opening comprises a first region having an open area greater than a diameter of said cylinder to admit the cylinder vertically therethrough without interference, and a second region open to said first region and more narrow than said first region, said second region defined in part by said wall portions.

11. A seat assembly for a utility vehicle, comprising:
 a seat having a bottom surface;
 a resilient seat suspension supporting said seat;
 at least one bracket extending vertically from said bottom surface and having multiple holes, and said resilient suspension includes a corresponding hole, said multiple holes are each registerable with said corresponding hole at select vertical adjustments of said seat with respect to said seat suspension, to accept a locking element through said one hole and said corresponding hole to set a front vertical adjustment of said seat.

12. The seat assembly according to claim 11, wherein said seat suspension comprises:
 an upper support plate;
 a baseplate;
 at least one of spring arranged between said baseplate and said upper support plate;

a front link pivotally connected to said baseplate at a front end and pivotally connected at a rear end to said upper support plate;

a rear link pivotally connected at a front end to said baseplate and at a rear end to said upper support plate, said front and rear links tilted rearward in a rising direction such that downward movement of said upper support plate causes simultaneous rearward movement of said upper support plate.

13. The seat assembly according to claim 11, wherein said multiple holes are arranged in a pattern that is tilted rearward in a rising direction such that upward adjustment of the seat causes simultaneous rearward adjustment of the seat.

14. A seat assembly for a utility vehicle, comprising:

a seat having a bottom surface;

a resilient seat suspension supporting said seat;

wherein said seat suspension comprises:
   an upper support plate;
   a baseplate;
   at least one of spring arranged between said baseplate and said upper support plate;
   a front link pivotally connected to said baseplate at a front end and pivotally connected at a rear end to said upper support plate;
   a rear link pivotally connected at a front end to said baseplate and at a rear end to said upper support plate, said front and rear links tilted rearward in a rising direction such that downward movement of said upper support plate causes simultaneous rearward movement of said upper support plate.

15. The seat assembly according to claim 14, comprising at least one bracket extending vertically from said bottom surface and having multiple holes, and said resilient suspension includes a corresponding hole, said multiple holes are each registerable with said corresponding hole at select vertical adjustments of said seat with respect to said seat suspension, to accept a locking element through said one hole and said corresponding hole to set a front vertical adjustment of said seat.

* * * * *